United States Patent
Modani et al.

(10) Patent No.: US 9,563,470 B2
(45) Date of Patent: Feb. 7, 2017

(54) BACKFILL SCHEDULING FOR EMBARRASSINGLY PARALLEL JOBS

(71) Applicant: International Business Machines Corporation, Armonk, NY (US)

(72) Inventors: Manish Modani, Ajmer (IN); Giridhar M. Prabhakar, Bangalore (IN); Ravindra R. Sure, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 14/138,239

(22) Filed: Dec. 23, 2013

(65) Prior Publication Data

US 2015/0178124 A1 Jun. 25, 2015

(51) Int. Cl.
*G06F 9/48* (2006.01)

(52) U.S. Cl.
CPC ....... *G06F 9/4881* (2013.01); *G06F 2209/483* (2013.01); *G06F 2209/5017* (2013.01)

(58) Field of Classification Search
None
See application file for complete search history.

(56) References Cited

U.S. PATENT DOCUMENTS

| | | |
|---|---|---|
| 2002/0194248 A1 | 12/2002 | Wood et al. |
| 2005/0034130 A1 | 2/2005 | Skovira |
| 2007/0143758 A1 | 6/2007 | Coppinger et al. |
| 2007/0143760 A1* | 6/2007 | Chan ..................... G06F 9/4881 718/102 |
| 2008/0155550 A1 | 6/2008 | Tsafrir et al. |
| 2009/0025004 A1 | 1/2009 | Barnard et al. |
| 2009/0031312 A1 | 1/2009 | Mausolf et al. |
| 2010/0293549 A1 | 11/2010 | Brelsford et al. |
| 2011/0247002 A1 | 10/2011 | Salapura et al. |
| 2012/0060166 A1* | 3/2012 | Jardine ................ G06Q 10/109 718/104 |
| 2012/0254597 A1 | 10/2012 | Delling et al. |
| 2015/0178126 A1 | 6/2015 | Modani et al. |

FOREIGN PATENT DOCUMENTS

CN 104731642 A 6/2015

OTHER PUBLICATIONS

Netto, M.A.S. Dept. of Comput. Sci., Sao Paulo Univ. Calheiros, R.N. ; Silva, R.K.S. ; De Rose, C.A.R. ; Northfleet, C. ; Cirne, W., Transparent resource allocation to exploit idle cluster nodes in computational grids, e-Science and Grid Computing, 2005. First International Conference on Jul. 1, 2005 in Melbourne, Vic.*

(Continued)

*Primary Examiner* — Abdullah Al Kawsar
*Assistant Examiner* — Jorge A Chu Joy-Davila
(74) *Attorney, Agent, or Firm* — Stephen R. Yoder

(57) ABSTRACT

Backfill scheduling for embarrassingly parallel jobs. A disclosed method includes: receiving an initial schedule having a plurality of jobs scheduled over time on a plurality of nodes, determining that a first job can be split into a plurality of sub-tasks that can respectively be performed in parallel on different nodes, splitting the first job into the plurality of sub-tasks, and moving a first sub-task from its position in the initial schedule to a new position to yield a first revised schedule.

14 Claims, 4 Drawing Sheets

(56) References Cited

OTHER PUBLICATIONS

Kamenoupoulos, D. et al., Distance measurement in volunteer computing networks: a completely decentralized approach, Sep. 1, 2004, Network Computing and Applications, 2004. (NCA 2004). Proceedings. Third IEEE International Symposium, Introduction.*
Snell et. al, Preemption Based Backfill, Nov. 27, 2002, Job Scheduling Strategies for Parallel Processing vol. 2537 of the series Lecture Notes in Computer Science, pp. 24-37.*
Etsion et al., "A Short Survey of Commercial Cluster Batch Schedulers", pp. 1-4, Published in 2005.
Foster, "Designing and Building Parallel Programs", Nov. 2003, Section 1.44 Parameter Study, <http://www-unix.mcs.anl.gov/dbpp/text/book.html>.
Frachtenberg et al., "New Challenges of Parallel Job Scheduling", JSSPP'07: Proceedings of the 13th international conference on Job scheduling strategies for parallel processing, Jun. 2007, vol. 4942, pp. 1-23, Springer-Verlag Berlin, Heidelberg © 2008.
Iglesias, Gladys Utrera, "Virtual Malleability Applied to MPI Jobs to Improve Their Execution in a Multiprogrammed Environment", Universitat Politècnica de Catalunya, 2010, 142 pages.
Khoo et al., "A multi-dimensional scheduling scheme in a Grid computing environment", Elsevier, Journal of Parallel and Distributed Computing 67 (2007), pp. 659-673, Received Feb. 1, 2006; received in revised form Nov. 30, 2006; accepted Jan. 31, 2007, Available online Feb. 20, 2007.
Lawson et al., "Self-adapting Backfilling Scheduling for Parallel Systems", pp. 1-10, Proceedings of the International Conference on Parallel Processing (ICPP'02) 0-7695-1677-7/02 $17.00 © 2002 IEEE.
Leung et al., "Parallel Job Scheduling Policies to Improve Fairness: A Case Study", 2010 39th International Conference on Parallel Processing Workshops, pp. 346-353, © 2010 IEEE, DOI 10.1109/ICPPW.2010.48.

Li et al., "Scheduling of a Relaxed Backfill Strategy with Multiple Reservations", Published in PDCAT '10 Proceedings of the 2010 International Conference on Parallel and Distributed Computing, Applications and Technologies, pp. 311-316, IEEE Computer Society Washington, DC, USA © 2010. doi>10.1109/PDCAT.2010.24.
Lurin et al., Scheduling for mixed parallel and sequential workload, Platform, The Power of Sharing, provided from post disclosure comments by searcher on Jan. 28, 2013—see Charts 69 onwards. pp. 1-116.
Niu et al., "Employing Checkpoint to Improve Job Scheduling in Large-Scale Systems", 16th International Workshop, JSSPP 2012, Shanghai, China, May 25, 2012, vol. 7698, pp. 36-55, © 2013.
Shmueli et al., "Backfilling with Lookahead to Optimize the Packing of Parallel Jobs", pp, 1-28, A preliminary version of this work has appeared in the 9th Workshop on Job Scheduling Strategies for Parallel Processing, Jun. 2003.
Streit, "Self-Tuning Job Scheduling Strategies for the Resource Management of HPC Systems and Computational Grids", Dissertation, Paderborn, Oct. 2003, pp. 1-15.
Tsafrir et al., "Backfilling Using System-Generated Predictions Rather Than User Runtime Estimates", IEEE Transactions on Parallel and Distributed Systems, vol. 18, No. 6, Jun. 2007, pp. 789-803, Digital Object Identifier No. 10.1109/TPDS.2007.1029.
Tsafrir et al., "The Dynamics of Backfilling: Solving the Mystery of Why Increased Inaccuracy May Help", 2006 IEEE International Symposium on Workload Characterization, © 2006 IEEE, pp. 131-141, Digital Object Identifier: 10.1109/IISWC.2006.302737.
Tsafrir, "Using Inaccurate Estimates Accurately", Dept. of Computer Science, Technion—Israel Institute of Technology, Haifa, Israel, provided from post disclosure comments by searcher on Jan. 28, 2013.
"Embarrassingly parallel", Wikipedia, the free encyclopedia, page last modified on Jul. 3, 2013 at 21:52, <http://en.wikipedia.org/wiki/Embarrassingly_parallel>.

* cited by examiner

| EXECUTION SEQUENCE | AVG. WAIT TIME | AVG. FLOW TIME | AVG. SLOWNESS | MAKE SPAN |
|---|---|---|---|---|
| 500 | 6.43 | 11.00 | 3.06 | 21.00 |
| 700 | 5.71 | 10.43 | 2.93 | 19.00 |

BACKFILL SCHEDULING FOR EMBARRASSINGLY PARALLEL JOBS

BACKGROUND OF THE INVENTION

The present invention relates generally to the field of task management, and more particularly to resource allocation.

Most modern parallel job schedulers give static resource allocations to jobs, that is, a job is allocated the number of independent resource sets (herein called nodes) that it requested in its job script and uses these resources in a dedicated manner throughout its execution. The widely used backfill algorithm based on the principle of first-come, first-served (FCFS) does the following: (i) maintains jobs in the order of their arrival in the job queue and schedules them in order if possible; (ii) upon a job's completion (or arrival, if there are no jobs currently running and no jobs currently in the queue), dispatches jobs from the queue front and reserves resources for the first job ("queue top job") in the queue that cannot be run due to insufficient resource availability; (iii) based on the user estimated wall times of the running jobs, calculate the backfill time window (user run-time estimates are inherently inaccurate such that there might be instances when backfill windows are left unpopulated due to runtime overestimation by users); and (iv) traverse the job queue and schedule jobs that can fit into the backfill window and whose execution will not interfere with the advance resource reservation of "queue top job" (such jobs should either complete before the reserved "queue top job" start time or occupy only resources that the advance reservation does not need to use).

Technical computing is increasingly oriented towards very large data sizes, with big data analytics emerging as a cutting edge technology. A large proportion of jobs in the big data analytics area are embarrassingly parallel (EP) jobs. In parallel computing, an embarrassingly parallel workload (or embarrassingly parallel problem) is one for which little or no effort is required to separate the problem into a number of parallel sub-tasks. This is often the case where no dependency (or communication) need exist between the parallel sub-tasks.

Some conventional schedulers employ a process in which the EP job is scheduled to start when a minimum number of resources are available. These methods that dynamically and adaptively schedule jobs in a way that aims to fill available resources optimally often employ the concept of "resizable jobs." In such schedules, jobs can shrink or expand to accommodate the changing pattern of resource availability. For example, once an EP job is started, it runs continuously until the EP job is completed. During this time, the EP job can be: (i) expanded by dynamically assigning it more resources ("expanding"); and/or (ii) shrunk by dynamically taking away some resources ("shrinking"), for example if resources are required for other high priority jobs.

SUMMARY

According to one aspect of the present disclosure, there is a computer program product, system and/or method which performs the following actions (not necessarily in the following order and not necessarily in serial sequence): receiving an initial schedule of jobs, including a plurality of jobs, scheduled over time on a plurality of nodes, determining that a first job from the plurality of jobs can be split into a plurality of sub-tasks that can respectively be performed in parallel on different nodes, splitting the first job into the plurality of sub-tasks, and moving a first sub-task from its position in the initial schedule to a new position to yield a first revised schedule.

DETAILED DESCRIPTION

Figure 1:
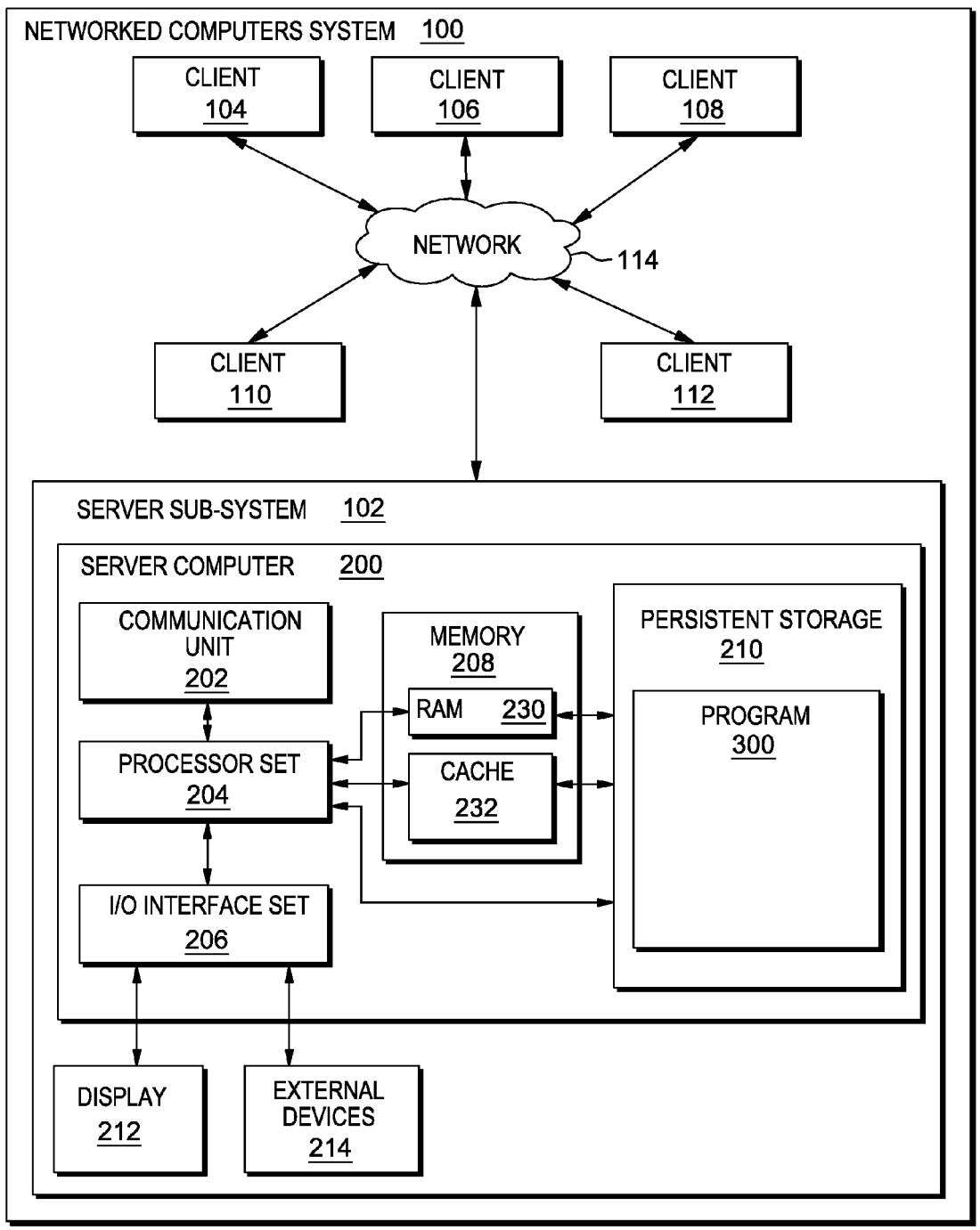
FIG. 1 is a schematic view of a first embodiment of a networked computers system according to the present invention.

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of networked computers system 100, including: server computer sub-system 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 300.

Server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary Note

The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
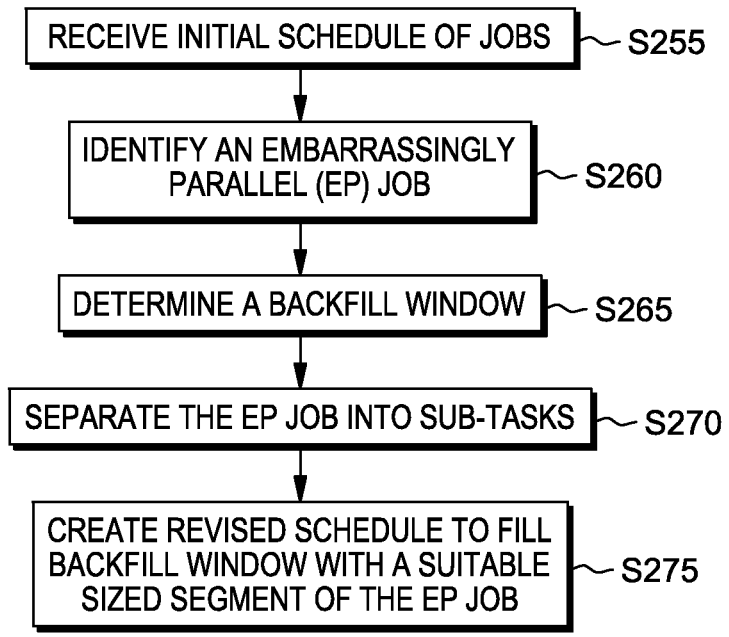
FIG. 2 is a flowchart showing a process performed, at least in part, by the first embodiment computer system.
Figure 3:
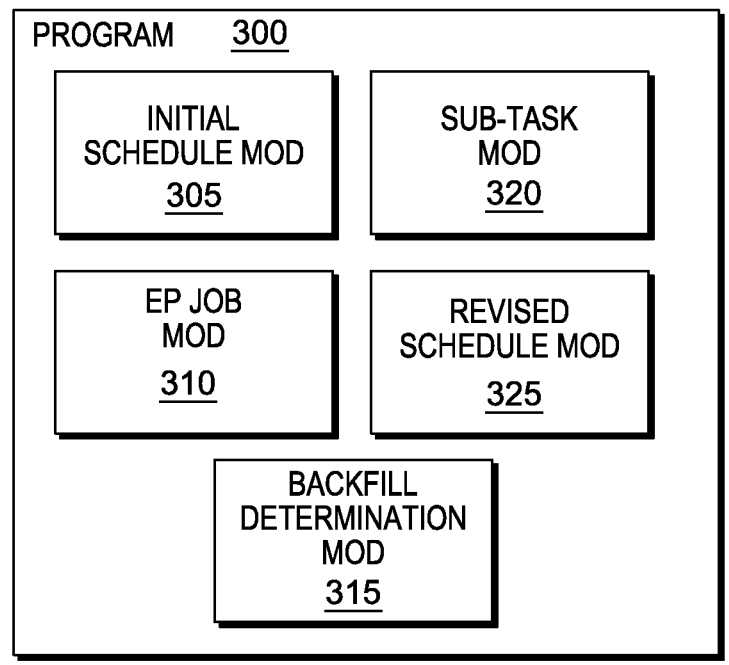
FIG. 3 is a schematic view of a portion of the first embodiment computer system.

FIG. 2 shows flow chart 250 depicting method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where initial schedule module 305 receives the initial schedule for a set of jobs in the queue to be processed. In this embodiment, the initial schedule is based on the first come, first served scheduling model. Alternatively, the initial schedule is provided after a backfill algorithm known in the art, or to be known in the future, is applied to an in-process job queue. The initial schedule mod receives the initial schedule for processing because scheduling gaps may arise for various reasons and when either before or after performing initial scheduling activity and/or backfill scheduling. These scheduling gaps are referred to herein as backfill windows.

Processing proceeds to step S260, where embarrassingly parallel (EP) job module 310 identifies an EP job in the initial schedule as-received by initial schedule mod 305. In this embodiment, the EP job is determined by user-provided information associated with the job. Alternatively, the job module uses analytics to determine that an EP job is in the queue. Alternatively, the job module refers to a set of characteristics that identify EP jobs. Alternatively, the job module determines only EP jobs having no dependency on other jobs in the queue.

User-provided information for identifying an EP job includes: (i) the smallest sequential task length, or number of data bits; (ii) the time required to run the smallest sequential length; and/or (iii) the minimum number of resources required to execute the smallest sequential length, of the embarrassingly parallel job. EP jobs run the same binary with different data sets. As used herein, the smallest sequential length is the minimum size of data required to run the EP job independently. For example, with a biology code, it is length of sequence, for a weather code, it is how many vertical levels, and so forth. A user, having experience and subject matter knowledge understands what the minimum required data length should be to run job independently.

Processing proceeds to step S265, where backfill determination module 315 determines that a backfill window exists. In this embodiment, the backfill module determines that a backfill window exists during execution of the jobs according to the initial schedule received in step S255. Alternatively, the backfill module determines a backfill window based on a pre-processing scheduling procedure with reference to the initial schedule. Alternatively, the backfill module determines a backfill window based on, or during, a simulated execution sequence.

A backfill window is an allocation of computing time made available by timing gaps in scheduled jobs on a node. Further, non-contiguous backfill windows are backfill windows that are available at non-contiguous times, or slots, in the execution sequence of either the same node or on different nodes. When backfill module 315 determines that a backfill window is available, the characteristics of the backfill window are determined as well. Backfill window characteristics include: (i) length of backfill window; and/or (ii) resources, or nodes, available over a backfill window length. It should be noted here that the "length" of a backfill window and the "length" of a job, or sub-task, refers to time, as in duration. For example, a job of a given length can "fit" into a backfill window of the same or greater length. It may be helpful also to refer to the number of nodes available in a given backfill window as the "width" of the backfill window. The width of a backfill window refers to two or more nodes having backfill windows that coincide in time such that, for example, a two-resource sub-task can fill a backfill window having a 2-node "width."

Processing proceeds to step S270, where sub-task module 320 creates sub-tasks by separating the EP job into sub-tasks. In this embodiment, the sub-tasks are mutually independent, that is: (i) it does not matter which of the sub-tasks is performed first; (ii) it does not matter if the sub-tasks are performed in a non-contiguous manner; and (iii) it does not matter if the sub-tasks are performed on multiple nodes. Alternatively, the sub-tasks of the EP job may include priority sub-tasks that must be performed before other sub-tasks of the same EP job. Alternatively, the sub-tasks of the EP job may not be available for parallel execution on various nodes.

Each sub-task that is created by sub-task module 320 includes one launch point and one completion point that may be used to fill a single backfill window of a specified length and/or width. In that way, each sub-task may execute separately on a given set of nodes, or resources, from the other sub-tasks of the same EP job.

In this embodiment, sub-task module 320 separates the EP job into sub-tasks according to the user-provided information about the EP job. Accordingly, step S270 may be performed before step S265 where the EP job is merely separated into the smallest possible sub-tasks. Alternatively, the sub-task module separates the EP job into sub-tasks having lengths that correspond to the determined backfill window lengths. This alternative embodiment allows the backfill window characteristics to influence the sub-task length, and is performed, therefore, after step S265, where the backfill window is determined.

Processing proceeds to step S275, where revised schedule module 325 creates a revised schedule that fills the backfill window determined in step S265 with a suitably sized segment of the EP job based on the EP job sub-tasks created by sub-task module 320. A suitably sized segment may be a combination of a set of sub-tasks or a single sub-task depending on the length (and possibly width) of the backfill window. In this embodiment, the suitably sized segment includes only one launch point and one completion point. Alternatively, the various sub-tasks remain independent, though grouped together; that is, the sub-tasks each maintain a launch point and a completion point.

III. Further Comments and/or Embodiments

Some embodiments of the present invention recognize that embarrassingly parallel (EP) jobs are being used in almost all disciplines and include jobs such as: (i) distributed set processing, which is a method to handle distributed relational database queries; (ii) serving static files on a webserver; (iii) Mandelbrot set and other fractal calculations with independent calculation points; (iv) computer graphics (for example, ray tracing)/parallel rendering, especially for large dataset visualization; (v) cryptography (especially brute-force searches); (vi) basic local alignment search tool (BLAST) searches in bioinformatics; (vii) face recognition; (viii) multi-parameter simulations (for example, Monte Carlo simulations for climate models, molecular dynamics, and so forth); (ix) genetic algorithms; (x) ensemble calculations for numerical weather prediction; (xi) event simulation and reconstruction in particle physics; (xii) sieving step of the quadratic and number field sieves; (xiii) tree growth step of the random forest machine learning technique; (xiv) bitcoin mining; (xv) analytics (for example, modeling and query processing using MapReduce); and/or (xvi) product simulations (increasingly used in the field of technical computing to simulate product designs).

While many of the examples above have a real-time sense, for example, rendering, file service, Mandelbrot set computing and computer graphics, many important applications may occur in a batch-processing setting, such as cryptography, BLAST searches, multi-parameter simulations, ensemble calculations for weather prediction, event simulation and reconstruction in particle physics, analytics, and/or product simulations.

Figure 4:
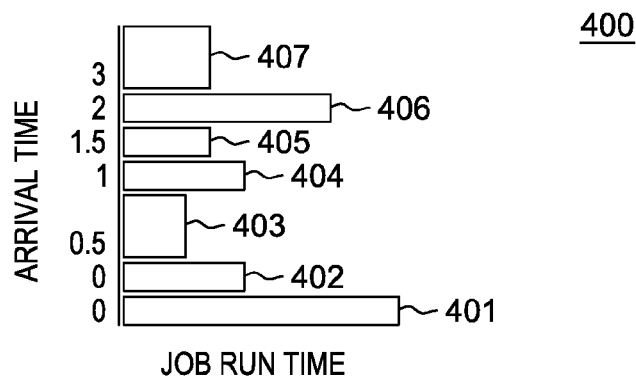
FIG. 4 is a job queue according to an embodiment of the present invention.

FIG. 4 is a chart depicting job queue 400, where seven jobs 401, 402, 403, 404, 405, 406, and 407 are in the job queue awaiting execution in the order of their arrival time according to a first-come, first-served (FCFS) service policy. The priorities of the jobs are in the order of their arrival time. Job 406 is embarrassingly parallel (EP).

Figure 5:
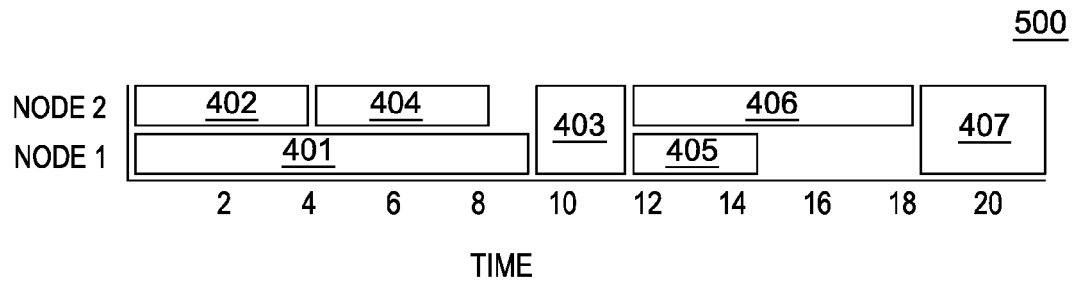
FIG. 5 is a conventional sequence of execution of the job queue shown in FIG. 4A.

FIG. 5 is a diagram showing sequence of execution 500 for jobs 401, 402, 403, 404, 405, 406, and 407 on a two-node cluster, Node 1 and Node 2, where EP job 406 is handled as a single, non-decomposable job. Jobs 401 and 402 are currently running. Job 403 is the top job for which resources are reserved. Only job 404 can be scheduled to execute before job 403 starts executing. According to the FCFS-based backfill algorithm, job 404 uses some of the resources available until the start of job 403. This resource-time availability is called a "backfill window." Resource-time availability is referred to herein as the "spatio-temporal gap," because a greater number of hardware resources correspond to larger space requirements. Once job 403 completes, job 405 and job 406 start executing. Job 407 remains in the queue until both jobs 405 and 406 complete execution because job 407 needs the resources that are used by both job 405 and job 406. Table 1, below, provides performance metrics based on sequence of execution 500.

TABLE 1

PERFORMANCE OF FCFS-BASED BACKFILL ALGORITHM (as shown in FIG. 5).

| JOB NO. | AR-RIVAL TIME | START TIME | FIN-ISH TIME | ACTUAL RUN TIME | WAIT TIME | FLOW TIME | SLOW-NESS |
|---|---|---|---|---|---|---|---|
| 401 | 0.0 | 0.0 | 9.0 | 9.0 | 0.0 | 9.0 | 1.00 |
| 402 | 0.0 | 0.0 | 4.0 | 4.0 | 0.0 | 4.0 | 1.00 |
| 403 | 0.5 | 9.0 | 11.0 | 2.0 | 8.5 | 10.5 | 5.25 |
| 404 | 1.0 | 4.0 | 8.0 | 4.0 | 3.0 | 7.0 | 1.75 |
| 405 | 1.5 | 11.0 | 14.0 | 3.0 | 9.5 | 12.5 | 4.17 |
| 406 | 2.0 | 11.0 | 18.0 | 7.0 | 9.0 | 16.0 | 2.29 |
| 407 | 3.0 | 18.0 | 21.0 | 3.0 | 15.0 | 18.0 | 6.00 |

The times shown are normalized with a standard unit of measure, such as "hours."

The performance metrics listed below are commonly used in the art and are defined herein for convenient reference.

(i) Arrival time: the time at which a job arrives in the queue.

(ii) Start time: the time at which a job starts executing on computing resources.

(iii) Finish time: the time at which a job completes execution.

(iv) Actual run time: the actual time spent by a job executing on the computing resources.

(v) Wait time: the time for which a job waits in the queue before it starts execution. Wait time is shown mathematically as: Wait Time=Start Time−Arrival Time.

(vi) Average wait time: the average of all wait times taken over a batch of jobs in the queue; representative of the average amount of time a given job is expected to wait in the queue.

(vii) Flow time: the time for which jobs existed in the queue; includes both wait time and run time. Flow time is shown mathematically as: Flow Time=Finish Time−Arrival Time.

(viii) Average flow time: the average of all flow times taken over a batch of jobs in the queue; representative of the average amount of time a given job is expected to spend in the queue.

(ix) Slowness: the ratio of the flow time of the job to the actual run time of the job. Slowness is shown mathematically as: Slowness=Flow time/Run time. Because flow time is at least equal to run time, slowness is at least 1.

(x) Average slowness: the average of all slowness taken over a batch of jobs in the queue. The higher the average slowness value, the more inefficient the schedule, because on average, jobs are spending more time waiting in the queue.

(xi) Makespan: the total time taken for a batch of jobs to be completely processed, that is, the total time for all jobs in the batch to be executed and exit the queue. Makespan is representative of the throughput of the scheduling system. The shorter the makespan, the more efficient the schedule.

Referring again to Table 1, it should be noted that EP job 406 has a wait time of 9 units, a flow time of 16 units, and a slowness of 2.29 units. These metrics are determined from execution sequence 500 showing both resources and elapsed time for the sequence.

Some embodiments of the present invention recognize that with conventional algorithms based on FCFS, the efficiency with which resources are utilized is a function of how well resources unusable by FCFS jobs are backfilled with smaller jobs. It is often the case that computer resources are not fully utilized, and there are many spatio-temporal gaps, or holes, of idling resources. To illustrate this with an example, and with reference to FIG. 5: despite backfilling with all available jobs in the queue, node 2 is free at time 9 whereas Node 1 is free from time 14 to time 18 according to sequence of execution 500. Backfilling these spatio-temporal gaps with jobs depends on the spatio-temporal requirements of the remaining jobs in the queue. This is a problem because job run-time is typically user-estimated. If no jobs from the job queue fit into the backfill window, then some resource(s) are necessarily kept idle during the backfill window period. Such idle time results in degradation of efficiency in resource utilization. The inefficiencies associated with existing FCFS-based backfill algorithms apply equally to other forms of backfill algorithms.

Some embodiments of the present invention recognize that scheduling strategies such as "expanding" and/or "shrinking" include unnecessary constraints such as: (i) requiring that a resource be available contiguously to keep the EP job running; (ii) fitting the resizable job into the backfill window only if it can finish before the start of a high-priority job; and/or (iii) lack of a strategy for the post-backfill window (the window that is available after a backfill algorithm is applied).

Some embodiments of the present invention provide one or more of the following features, characteristics, and/or advantages: (i) have a post-backfill scheduling strategy for improving performance and resource utilization of schedules using a backfill algorithm that applies to job queues containing one or more EP jobs; (ii) apply embarrassingly parallel backfill (EPB) process at a post-backfill stage, as a second pass, after a conventional backfill pass to more completely fill the backfill window; (iii) use dynamic job segmentation for a backfill window, including a post-backfill window; (iv) use adaptive post-backfill scheduling; and/or (v) improve resource utilization by scheduling the parallel sub-tasks of an EP job individually in the backfill window (that is, the EP job is divided into parallel sub-tasks such that some or all of these tasks fit in the backfill window).

Division of an EP job into sub-tasks requires that certain information be provided, including: (i) minimum sequential length of data bits; (ii) time required to run the minimum sequential length; and/or (iii) minimum number of resources required to execute the minimum sequential length. The sub-tasks that are created in this way may or may not fit and/or run in the backfill window. Some embodiments of the present invention dynamically divide the EP job into data segments made up of one or more lengths of sub-tasks so that the various data segments fit in the actual backfill window.

Figure 6:
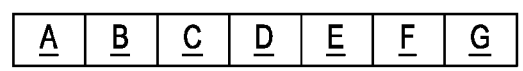
FIG. 6 is an embarrassingly parallel job according to an embodiment of the present invention.

FIG. 6 is a diagram of EP job 406 showing the job divided into seven independent parallel sub-tasks A, B, C, D, E, F, and G. In the illustrated embodiment, the sub-tasks represent the smallest sequential length task of the EP job. Alternatively, the sub-tasks are not equally sized. Alternatively, the sub-tasks represent lengths corresponding to one or more non-contiguous backfill windows.

Some embodiments of the present invention provide a process for scheduling EP jobs that must be executed in a sequence due to their dependence on previously executed jobs. For example, a first set of jobs may be acting on independent data sets, and a final job may be collecting and operating on output data from the first set of jobs. This case, too, may be regarded as an EP job, and the final job(s) may be executed by imposing a dependency that these job(s) are executed only after the first set of jobs is executed, using currently available and standard features in job schedulers. Accordingly, it is common to find at least one or two EP jobs in any given job queue. Therefore, the proposed backfill algorithm to divide the EP jobs into sub-tasks automatically to improve the throughput of the system is useful for the high performance computing (HPC) community.

Some embodiments of the present invention include one, or more, of the following features, characteristics, and/or advantages: (i) based on user-provided parameters, the scheduler dynamically generates a segment which is composed of a seamless merger of multiple EP job sub-tasks (the segment is not simply an "assembly" of multiple sub-tasks having retained all the job launch and job completion points of each individual component sub-task; rather, the segment includes just one job launch, and just one job completion point); (ii) job segments are dynamic because the size, or length, of the segment is dynamically determined based on the available backfill windows; (iii) over time, the pattern of available backfill windows changes, and the composition of job segments is also changed accordingly; (iv) EPB becomes active after the conventional backfill process is completed in a schedule; (v) once the conventional backfill process is completed, the EP jobs are segmented (or re-segmented) according to the available pattern of unfilled backfill windows; (vi) the EP job segments are scheduled to optimally utilize available resources (this step is adaptive because EPB segments/re-segments EP jobs to optimally utilize resource availability patterns that change over time due to: (a) variations in incoming job requirements, (b) errors in job run time estimates, and/or (c) variations in job run time estimates; (vii) the approach is non-intrusive to all scheduling algorithms (the approach in EPB ensures that the method does not impact any previously scheduled job; that is, the dynamics and performance of the primary scheduling and backfill algorithms are, at worst, unaffected, and in general, improved); (viii) the approach is compatible with all backfill methods (because EBP is a post-backfill strategy, it is applied after the initial backfill pass has been performed in a schedule, so it can independently contribute improvement in schedule performance and resource utilization over and above the contribution from conventional backfill algorithms; (ix) the approach utilizes non-contiguous resources (EPB is applicable even when a given EP job cannot fit completely into the available shadow time); and/or (x) the dynamic segmentation and adaptive scheduling approach does not require that computer resources be available contiguously, therefore efficient usage of non-contiguous resources is available.

Some embodiments of the present invention include one, or more, of the following features, characteristics, and/or advantages: (i) reduction in scheduling overhead when compared to jobs handled, for example, as a job array (the segmentation method used by EPB eliminates the launch and completion steps of all sub-tasks within a segment, except for the launch of the first sub-task and the completion of the last sub-task); (ii) the identity of individual sub-tasks are merged into a single segment; (iii) reduction in processing overhead (by eliminating redundant launch and completion steps of component sub-tasks within a segment, the overhead resulting from having to initialize, finalize, and combine the results of individual sub-tasks is also eliminated because the segment is viewed as a single, seamless job); (iv) improved job turnaround time (because EPB optimally schedules EP jobs by dynamically segmenting them and adaptively scheduling them); (v) it is more likely that backfill windows are used by EP jobs where EPB is practiced, thus potentially improving job throughput; (vi) improved resource utilization, because EPB can use non-contiguous resources; (vii) EPB is less sensitive to runtime overestimation because dynamic segmentation allows a greater possibility to resize EP jobs into segments that fit the available backfill window, even when runtimes have been overestimated; (viii) resources that would otherwise have been kept idle due to non-utilization (including the contribution from run time overestimation) can be minimized or even completely avoided when EPB is applied; and/or (ix) EPB can be easily added into conventional schedulers.

Some embodiments of the present invention provide for method(s) that include one, or more, of the following: (i) dynamic job segmentation; (ii) adaptive post-backfill scheduling over unused backfill windows; (iii) user-provided information that includes one or more of the following three parameters: (a) the smallest sequential task length of data bits, (b) the time required to run the smallest sequential length, and (c) the minimum number of resources required to execute the smallest sequential length, of the embarrassingly parallel job; (iv) based on the user-provided parameters, the scheduler dynamically generates a segment which is composed of a seamless merger of multiple sub-tasks; (v) once the backfill step is completed, the embarrassingly parallel jobs are segmented (or re-segmented) according to the available pattern of unfilled backfill windows, and the jobs are scheduled to maximally utilize the available resources; (vi) when the user submits the EP jobs, the user specifies the wall clock time and resources requirements of the smallest sub-task (smallest sequential length); and/or (vii) the attributes of the smallest sub-task are used to generate an appropriate segment while scheduling the EP job.

Some embodiments of the present invention follow one, or more, of the following steps in conjunction with a conventional FCFS-Backfill process: (i) maintain jobs in the order of their arrival in the job queue and schedule them in order if possible; (ii) upon a job's completion (or arrival, if there are no jobs currently running and no jobs currently in the queue), dispatch jobs from the queue front and reserve resources for the first job ("queue top job") in the queue that cannot be run due to insufficient resource availability; (iii) based on the user-estimated wall times of the running jobs, calculate the backfill time window; (iv) traverse the job queue and schedule jobs that can fit into the backfill window and whose execution will not interfere with the advance resource reservation of "queue top job" (such jobs should either complete before the reserved "queue top job" start time or occupy only nodes that the advance reservation does not need to use); (v) apply a dynamic segmentation process to EP jobs including: (a) calculating the available resources; (b) calculating the available time of the available resources; (c) traversing the job queue for EP jobs; (d) determining whether any EP jobs include one or more smallest jobs that fit the available backfill window resources; and/or (e) generating the appropriate EP job segment (the size of the segment is a multiple of the smallest EP job sub-tasks); (vi) apply adaptive post-backfill scheduling by scheduling the appropriate EP job segment into the available unpopulated backfill window(s); and/or (vii) where there are multiple non-contiguous windows present, create multiple appropriate job segments in step (v) on-demand and schedule those segments, having an appropriate length of data bits, in the unpopulated backfill windows.

The unpopulated backfill windows include: (i) central processor unit (CPU) cores that are not all located on the same chip; and/or (ii) CPU cores that suddenly become available due to a job completing earlier than was anticipated, but no backfill job is available to take up the available cores according to step (iv) of the conventional FCFS-Backfill process, above.

A simplified pseudo-code for dynamic job segmentation according to an embodiment of the present invention follows:

```
1:   if job:smallest_sequence:size > RM:free:size then
2:       continue
3:   end if
4:   find N where ( N * job:smallest_sequence:size ) <= RM:free:size
         and (( N+1) * job:smallest_sequence:size ) > RM:free:size
5:   segment = N * job:smallest_sequence
```

A simplified pseudo-code for adaptive post-backfill scheduling according to an embodiment of the present invention follows:

```
1:   predictRuntime = segment:estimateRuntime
2:   if (predictRuntime <= backfill_window) or (sub_task:size <=
     extra_size) then
3:       segment:predictEndtime = predictRuntime + now( )
4:       backfill(segment)
5:       RM:free:size = RM:free:size − segment:size
6:       if predictRuntime > backfill_window then
7:           extra_size = extra_size − segment:size
8:       end if
9:   end if
```

Figure 7:
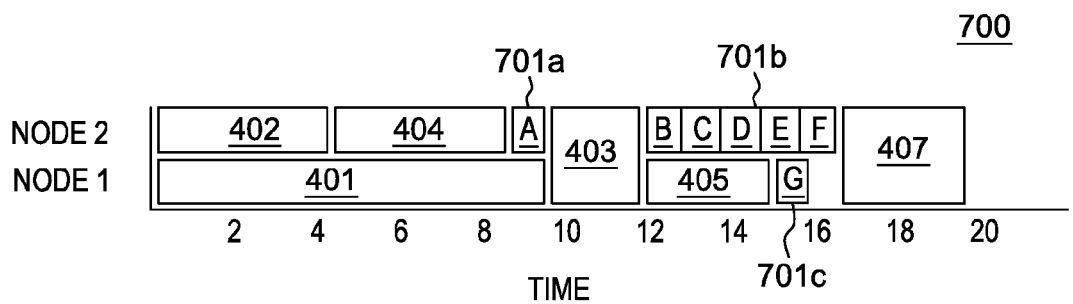
FIG. 7 is a sequence of execution of the job queue shown in FIG. 4A according to an embodiment of the present invention.

FIG. 7 is a diagram showing sequence of execution 700 for jobs 401, 402, 403, 404, 405, and 407, and where EP job 406 (see FIG. 6) is handled as a set of EP job segments 701a, 701b, and 701c collectively made up of EP job sub-tasks A, B, C, D, E, F, and G on a two-node cluster, Node 1 and Node 2. Jobs 401 and 402 are currently running. Job 403 is the top job for which resources are reserved. Job 404 is scheduled to execute before job 403 starts executing. Also, segment 701a, made up of sub-task A, is scheduled to execute before job 403 starts executing. Once job 403 completes, job 405 starts executing. Also, EP job segment 701b, made up of sub-tasks B, C, D, E, and F, is scheduled to execute in parallel with job 405 and with EP job segment 701b, made up of sub-task G, on multiple nodes. Job 407 remains in the queue until both jobs 405 and 406 complete execution because job 407 needs resources that are used by both jobs 405 and job segments 701b and 701c. By applying EPB to the scheduler strategy, system throughput and turn-around time are improved. Table 2, below, provides performance metrics based on sequence of execution 700.

TABLE 2

PERFORMANCE OF FCFS-BASED ALGORITHM WITH
EPB POST-BACKFILL PROCESS (as shown in FIG. 7)

| JOB NO. | AR- RIVAL TIME | START TIME | FIN- ISH TIME | ACTUAL RUN TIME | WAIT TIME | FLOW TIME | SLOW- NESS |
|---|---|---|---|---|---|---|---|
| 401 | 0.0 | 0.0 | 9.0 | 9.0 | 0.0 | 9.0 | 1.00 |
| 402 | 0.0 | 0.0 | 4.0 | 4.0 | 0.0 | 4.0 | 1.00 |
| 403 | 0.5 | 9.0 | 11.0 | 2.0 | 8.5 | 10.5 | 5.25 |
| 404 | 1.0 | 4.0 | 8.0 | 4.0 | 3.0 | 7.0 | 1.75 |
| 405 | 1.5 | 11.0 | 14.0 | 3.0 | 9.5 | 12.5 | 4.17 |
| 701 | 2.0 | 8.0 | 16.0 | 7.0 | 6.0 | 14.0 | 2.00 |
| 407 | 3.0 | 16.0 | 19.0 | 3.0 | 13.0 | 16.0 | 5.33 |

The times shown are normalized with a standard unit of measure, such as "hours." As shown in FIG. 7, all jobs are finished at time=19 in comparison to time=21 when the FCFS-based backfill algorithm is used alone (see FIG. 5). EP job 406 (see FIG. 6) is divided into segments 701a, 701b, and 701c and is collectively referred to as job 701 in Table 2. It should be noted that job 701 demonstrates improved metrics over the single job 406 as scheduled in sequence 500 (see FIG. 5). The wait time of job 701 is 6 units, compared to 9 for job 406. The flow time of job 701 is 14 units, compared to 16 for job 406. The slowness of job 701 is 2.00, compared to 2.29 for job 406.

Figures 8A, 8B:
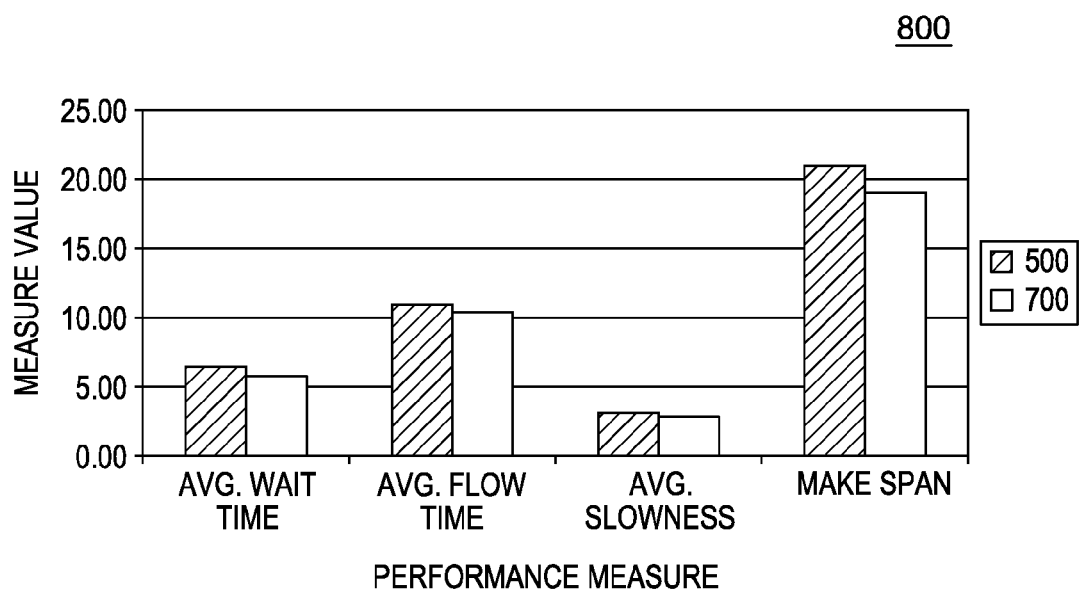
FIG. 8A is a performance chart demonstrating job queue execution performance according to an embodiment of the present invention.
FIG. 8B is a performance table demonstrating job queue execution performance according to an embodiment of the present invention.

FIGS. 8A and 8B compare the performances of sequences of execution 500 and 700. Performance chart 800 of FIG. 8A compares the average wait times, flow times, slowness, and makespans of the two sequences of execution shown in FIGS. 5 and 7. The performance data represented in chart 800 is shown in Table 805 of FIG. 8B.

Some embodiments of the present invention include one or more of the following features, characteristics, and/or advantages: (i) the ability to resize and/or split EP jobs to optimize the backfill scheduler; (ii) the capability to split an EP HPC job in order to fit a backfill scheduling window; (iii) a focus on scheduling variable-length sub-tasks; (iv) a methodology that is not dependent on accuracy of wall-time estimates; (v) the ability to efficiently consume the resources available in backfill window; (vi) the EP job is divided into sub-tasks to consume resources available in the backfill windows so that the execution of sub-tasks can easily be finished before the start of a high-priority job; (vii) the EPB algorithm does not require contiguous resources; (viii) a new job-handling strategy after backfill; (ix) non-intrusive to all scheduling algorithms; (x) the EP job is divided into sub-tasks by the scheduler dynamically; (xi) the sizes of the EP job sub-tasks varies by available resource(s) and the time available for these resource(s); (xii) sub-tasks can be used to absorb the resources available in the backfill window; (xiii) the backfill resources need not to be contiguous; (xiv) the resources, or slots, available in the backfill window can be divided into contiguous blocks and sequences made up of one or more sub-tasks and can be generated such that each sequence would completely occupy the contiguous blocks; (xv) sequences can be used to absorb the resources available in the backfill window; (xvi) the backfill resources need not be contiguous; (xvii) there is no application-level scheduling involved; and/or (xviii) some applications having corresponding EP jobs scheduled should support division of the EP job into multiple independent sub-tasks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Embarrassingly parallel (EP) job: any computer job for which little or no effort is required to separate the job into segments that can be run in parallel on different nodes.

Sub-task: any task division of an EP job; in some embodiments the sub-tasks are defined by smallest sequential length of databits; in some embodiments, the user provides the smallest sequential length value; in some embodiments, most, or all, sub-tasks of an EP job will have the same length (for example, the smallest sequential length).

What is claimed is:

1. A computer program product comprising software stored on a non-transitory computer storage medium, the software comprising:
   first program instructions programmed to receive an initial schedule of jobs, including a plurality of jobs, scheduled over time on a plurality of nodes;
   second program instructions programmed to determine that a future job from the plurality of jobs can be split into a plurality of sub-tasks that can respectively be performed in parallel on different nodes, each sub-task of the plurality of sub-tasks being defined individually by corresponding pre-defined durations and corresponding sub-task node counts;
   third program instructions programmed to determine a backfill window in the initial schedule of jobs, the backfill window having a window duration and a window node count;
   fourth program instructions programmed to separate the future job into the plurality of sub-tasks by their corresponding pre-defined durations;
   fifth program instructions programmed to generate a set of backfill sub-tasks from the plurality of sub-tasks based on the corresponding pre-defined durations of each sub-task of the plurality of sub-tasks, each backfill sub-task having a combined pre-defined duration matching the window duration, and having sub-task node counts that match the window node count;
   sixth program instructions programmed to remove the future job from the initial schedule of jobs;
   seventh program instructions programmed to add the set of backfill sub-tasks into the backfill window to yield a revised schedule of jobs; and
   eighth program instructions programmed to execute the plurality of jobs and the set of backfill sub-tasks according to the revised schedule of jobs.

2. The computer program product of claim 1 further comprising:
   seventh program instructions programmed to receive job information for the future job including one of the following: a smallest sequential job length, a time required to run the smallest sequential job length, or a number of resources required to execute the smallest sequential job length; and
   wherein generating the set of backfill sub-tasks is further based upon the job information.

3. The computer program product of claim 1 wherein:
   the pre-defined durations add up to the combined pre-defined duration being less than or equal to the window duration.

4. The computer program product of claim 1 further comprising:
   ninth program instructions programmed to combine two or more sub-tasks of the set of backfill sub-tasks into one sub-task having one launch point and one completion point.

5. The computer program product of claim 1 wherein the plurality of sub-tasks are of equal length.

6. The computer program product of claim 1 wherein:
   a plurality of backfill windows are identified and the set of backfill sub-tasks are run in the plurality of backfill windows such that at least two backfill sub-tasks are run in is non-contiguous backfill windows.

7. The computer program product of claim 1, wherein determining the backfill window in the initial schedule of jobs further includes determining a plurality of backfill windows and the set of backfill sub-tasks are run in the plurality of backfill windows such that at least portions of two backfill sub-tasks are run in parallel on parallel nodes.

8. A computer system comprising:
   a processor(s) set; and
   a software storage device;
   wherein:
   the processor set is structured, located, connected and/or programmed to run software stored on the software storage device; and
   the software comprises:
     first program instructions programmed to receive an initial schedule of jobs, including a plurality of jobs, scheduled over time on a plurality of nodes;
     second program instructions programmed to determine that a future job from the plurality of jobs can be split into a plurality of sub-tasks that can respectively be performed in parallel on different nodes, each sub-task of the plurality of sub-tasks being defined individually by corresponding pre-defined durations and corresponding sub-task node counts;
     third program instructions programmed to determine a backfill window in the initial schedule of jobs, the backfill window having a window duration and a window node count;
     fourth program instructions programmed to separate the future job into the plurality of sub-tasks by their corresponding pre-defined durations;
     fifth program instructions programmed to generate a set of backfill sub-tasks from the plurality of sub-tasks based on the corresponding pre-defined durations of each sub-task of the plurality of sub-tasks, each backfill sub-task having a combined pre-defined duration matching the window duration, and having sub-task node counts that match the window node count;
     sixth program instructions programmed to remove the future job from the initial schedule of jobs;

seventh program instructions programmed to add the set of backfill sub-tasks into the backfill window to yield a revised schedule of jobs; and eighth program instructions programmed to execute the plurality of jobs and the set of backfill sub-tasks according to the revised schedule of jobs.

9. The computer system of claim 8 further comprising:

ninth program instructions programmed to receive job information for the future job including one of the following: a smallest sequential job length, a time required to run the smallest sequential job length, or a number of resources required to execute the smallest sequential job length; and wherein generating the set of backfill sub-tasks is further based upon the job information.

10. The computer system of claim 8 wherein:

the pre-defined durations add up to the combined pre-defined duration being less than or equal to the window duration.

11. The computer system of claim 8 further comprising:

ninth program instructions programmed to combine two or more sub-tasks of the set of backfill sub-tasks into one sub-task having one launch point and one completion point.

12. The computer system of claim 8 wherein the plurality of sub-tasks are of equal length.

13. The computer system of claim 8 wherein:

a plurality of backfill windows are identified and the set of backfill sub-tasks are run in the plurality of backfill windows such that at least two backfill sub-tasks are run in is non-contiguous backfill windows.

14. The computer system of claim 8, wherein determining the backfill window in the initial schedule of jobs further includes determining a plurality of backfill windows and the set of backfill sub-tasks are run in the plurality of backfill windows such that at least portions of two backfill sub-tasks are run in parallel on parallel nodes.

* * * * *